United States Patent [19]
Bosse

[11] 3,855,025
[45] Dec. 17, 1974

[54] WELDING CYLINDER WITH PERIPHERALLY EXTENDING WELDING BAND

[75] Inventor: Frank Bosse, Ibbenburen-Dorenthe, Germany

[73] Assignee: Windmoller & Holscher, Lengerich of Westphalia, Germany

[22] Filed: May 10, 1973

[21] Appl. No.: 359,001

[30] Foreign Application Priority Data
May 18, 1972 Germany.......................... 2224317

[52] U.S. Cl................ 156/582, 156/583, 219/216, 219/243, 219/469
[51] Int. Cl. ....................... B32b 31/00, H05b 1/00
[58] Field of Search ........... 156/582, 583; 338/316; 219/469, 470, 471, 244, 243, 216

[56] References Cited
UNITED STATES PATENTS
2,556,008 6/1951 Spalding........................... 152/582
2,912,661 11/1959 Balestrini........................... 338/316
3,253,122 5/1966 Kochmer et al. .................. 338/316

*Primary Examiner*—Douglas J. Drummond
*Attorney, Agent, or Firm*—Fleit & Jacobson

[57] ABSTRACT

In a rotary welding cylinder for welding thermoplastic film passed thereabout along a seam extending circumferentially of the cylinder, variations in the length of a welding band which extends around the cylinder and is rotatable therewith are compensated by mounting the ends of the band in a radially extending recess of the cylinder, the band being passed about rounded-off edges at the transition between the cylinder periphery and the recess. At least one of said edges is formed on a spring-influenced tensioning jaw which is yieldable in the circumferential direction of the cylinder, the ends of the band being secured in the recess so as to be non-yieldable radially of the cylinder.

4 Claims, 1 Drawing Figure

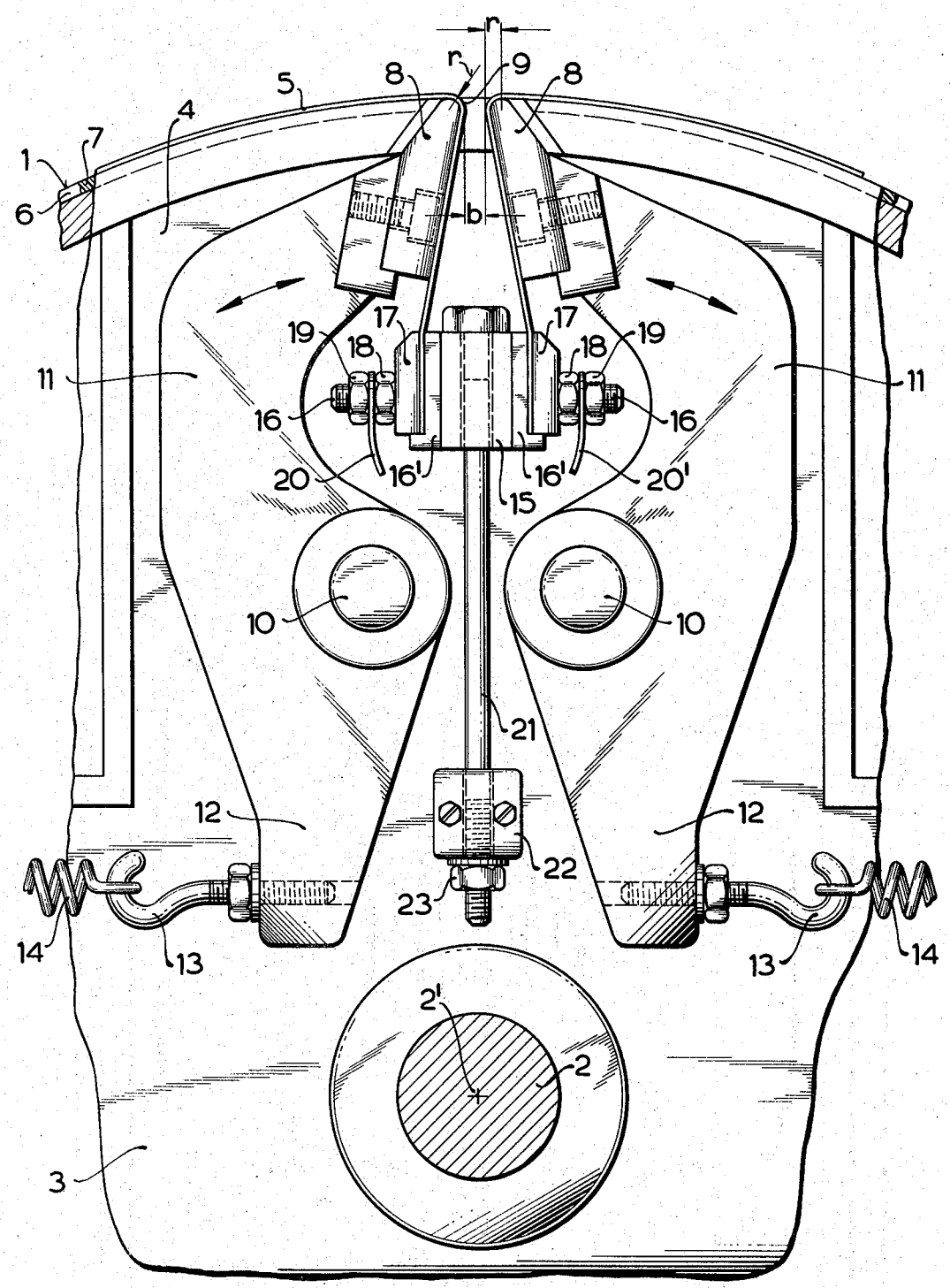

WELDING CYLINDER WITH PERIPHERALLY EXTENDING WELDING BAND

The invention relates to a rotary welding cylinder for welding thermoplastic film passed thereabout along a seam extending circumferentially of the cylinder and comprising a welding band which extends around the cylinder, is rotatable therewith, and is held to its periphery under tension, the ends of the band being mounted in a radially extending recess of the cylinder.

Such a welding cylinder is described in German Specification No. 1,779,733. In that case, the transition between the cylinder periphery and the recess in which mounting means for the ends of the band are accommodated is formed by rounded-off edges about which the welding band is passed. In operation, at least when the welding cylinder is started and stopped and upon any interruptions in the operation, the welding band, which is electrically energised, is alternately heated and cooled and this leads to corresponding elongation and contraction of the welding band. To ensure that the band will be taut on the cylinder at all temperatures, the radial recess in the cylinder not only accommodates mounting means for the band but also means for compensating variations in the length of the band.

In the known welding cylinder, such length compensation is effected by providing a spring influenced bolt for pressing on a radially extending portion of the band within the cylinder recess. The pressure on the band keeps the latter taut by pulling it about one of the rounded-off edges at the transition between the cylinder periphery and the recess. In this way, the position at which the welding band is bent to pass into the recess changes continually. By reason of the brittleness of the welding band material, the radius of each rounded-off edge must therefore be as large as possible. On the other hand, the provision of large radii for the edges will have the result that there is a comparatively long gap in the band in the circumferential direction of the cylinder and consequently the weld seam produced by the band will contain a correspondingly long interruption in its length. To keep the interruption to a minimum, therefore, the radius of the edges should be as small as possible. It is conceivable that it should be possible to find a compromise between these two conflicting requirements so that the radii are just large enough to keep the interruption in the longitudinal weld seam to less than the width of a transverse weld seam so that the gap in the longitudinal seam as produced by the welding band can then be closed by a transverse weld seam. Even this compromise is not attainable in practice because the welding band still tends to fracture at the positions where it is bent about the rounded-off edges.

The invention aims to make provision for the compensation in length of the welding band without sacrificing the close juxtapositioning of the rounded-off edges and without giving rise to frequent fractures in the band at the position of the rounded-off edges and yet to ensure that the welding band will always be held taut.

According to the invention, there is provided a rotary welding cylinder for welding thermoplastic film passed thereabout along a seam extending circumferentially of the cylinder, comprising a welding band which extends around the cylinder, is rotatable therewith, and is held to its periphery under tension, the ends of the band being mounted in a radially extending recess of the cylinder by being passed about rounded-off edges at the transition between the cylinder periphery and the recess, wherein at least one of said edges is formed on a spring influenced tensioning jaw which is yieldable in the circumferential direction of the cylinder and wherein the ends of the band are secured in the recess so as to be nonyieldable radially of the cylinder. Preferably, both said edges are formed on a respective spring influenced tensioning jaw.

The yieldable mounting of the or each tensioning jaw makes it possible to keep the radius of curvature of the respective rounded-off edge very small indeed because, upon a change in length of the welding band, the latter is not pulled over the edge; instead, the edge moves along with it. When it is first installed, the welding band can be pulled tautly about the curved edges and it will adapt itself to the small radius of curvature under cold deformation. Subsequent compensation in length and the constant maintaining of the tension in the band is effected by the yielding tensioning jaw or jaws. Constructionally, the invention provides an ingenius solution to the problem, which was by no means obvious from welding equipment using straight welding beams, because the invention is applicable to welding cylinders where there is little available space if the distance between the rounded-off edges is to be kept as small as possible.

In one form of the invention, each tensioning jaw is pivotable about an axis parallel to the rotary axis of the cylinder, and each jaw is provided with a lever arm directed away from the respective pivotal axis, each arm being subjected to the force of an influencing spring tending to move the edges on the jaws towards one another. To provide a simple mounting of the ends of the welding band, at least one end of the band in the recess is screw-connected to a radially adjustable block provided with means for making an electrical connection to each end of the band, the two ends being electrically insulated from one another. The block may be provided with a radially extending tensioning screw passed through a supporting member co-operating with an adjusting nut on the screw.

An example of the invention will now be described with reference to the accompanying drawing wherein the single FIGURE is a fragmentary end elevation of a rotary welding cylinder 3 having a welding band 5 slung about its periphery. The surface of the cylinder is indicated at 1 and its rotary shaft at 2. The cylinder 3 is provided with a recess 4 for accommodating means for mounting the ends of the welding band 5 and for compensating variations in its length as caused by temperature changes. The band 5 is located at an end of the cylinder and thus the recess 4 is open towards such end and is freely accessible. At the place where the welding band 5 is to be supported by the cylinder, its surface 1 is provided with a circumferential groove 6 which is wider than the width of the welding band and which contains a silicon rubber strip 7 of the same shape as the groove. The silicon rubber strip serves to insulate the band 5 electrically from the metal cylinder 3 and to provide the band with a support of low flexibility.

The ends of the band 5 are passed into the recess 4 about edges 9 which are rounded-off with a radius of curvature $r$ and are located at the transition between the cylinder surface and the recess 4. The edges 9 are formed on respective electrically non-conductive rim members 8 which may be made of porcelain. Each rim member 8 is screw-connected to as associated tensioning jaw 11 which is pivotable about a shaft 10. Each jaw 11 carries a lever arm 12 which is directed away from the pivotal axis and is provided with a hook 13 for mounting one end of a spring 14, the other end of which (not shown) is attached to an end or cover plate for the welding cylinder. It will be evident that the jaws 11 are biassed by the springs 14 in the sense of moving the edges 9 towards one another so that the gap $b$ between the edges will be a minimum.

The terminal portions of the band 5 are screw-connected to an electrically non-conductive block 15 is a manner such that the ends are electrically insulated from one another. For this purpose, use is made of screws or bolts 16 having a specially shaped head 16' which is secured to the block 15 by means of adhesive or some other head-resistant means. The ends of the band are clamped between a plate 17 and the respective head 16' of the screw or bolt by means of a first nut 18 on the bolt. Between the said first nut 18 and a second nut 19, the bolt 16 carries an electric lead 20 or 20' for the supply of electric current to the ends of the band 5. The electric leads extend to a pair of slip rings (not shown) which rotate together with the welding cylinder and which are energised by brushes (not shown) from a source of heating current (not shown). The block 15 is provided with a radially inwardly extending tensioning screw 21 which passes through a supporting member 22 on the end or cover plate of the cylinder. By means of a nut 23 tightened against the supporting member 22 the block 15 can be pulled radially inwardly of the cylinder to tension the welding band 5. This tensioning is carried out only when the band is first installed and causes the band to adapt itself to the curvature of the edges 9 by cold deformation. If the nut 23 is tightened further, the band will be pulled over the rounded-off edges at the position where the band is bent and the gap $b$ between the rim members of the jaws will become wider. In the cold condition of the welding band, the gap $b$ should be such that it will be a little longer than the largest amount of elongation to which the band is subjected during operation so that, even when the elongation in the band is a maximum, the edges 9 will not touch one another and possibly give rise to an electric short circuit. Although at least the radially outwardly directed side of the welding band will generally be provided with an electrically non-conductive layer of polytetrafluoroethylene (with a view to preventing the plastics film that is being welded from becoming baked to the band 5), this layer is so thin that a short circuit cannot be avoided with certainty if the edges 9 are too close to one another. In any case, the edges 9 must not touch because this would impede proper tensioning of the band to hold it to the cylinder surface.

Elongation of the welding band 5 during operation is compensated by the tensioning jaws 11 which are influenced by the springs 14 and by the yielding rim members 8 carried by the jaws, relative movement between the welding band and the edge 9 on each rim member 8 and consequent deformation of the welding band at the position where it is bent about the edges 9 being avoided as the band undergoes elongation. From a kinematic point of view, the axes of the pivotal shafts 10 of the jaws 11 should be as close as possible to an imaginary straight line connecting the respective rounded edge 9 to the axis 2' of the rotary shaft 2 of the cylinder so that the direction of movement of each edge 9 will be as closely as possible tangentially to the cylinder surface 1. In the illustrated example, the departure of the pivotal axis of each jaw from the said imaginary connecting line is constructionally unavoidable in view of the components 21, 22, 23 but any inaccuracy caused by such departure is negligible.

I claim:

1. A rotary welding cylinder for welding thermoplastic film passed thereabout along a seam extending circumferentially of the cylinder, comprising a cylinder mounted for rotation, a welding band extending around said cylinder, rotatable therewith and held on the periphery of said cylinder under tension, said cylinder defining a radially extending recess with the ends of said band extending into said recess, the transition between said cylinder periphery and said recess being defined by rounded-off edges, a pivotally mounted tensioning jaw defining at least one of said rounded-off edges and being movable in the circumferential direction of the cylinder, means securing the ends of said band in said recess to be non-yielable radially of the cylinder, and resilient means biasing said tensioning jaw to maintain said band under tension on the periphery of said cylinder.

2. A rotary welding cylinder according to claim 1 wherein a pivotally mounted tensioning jaw defines each rounded-off edge, the pivotal axis of each said jaw is parallel to the rotary axis of said cylinder, each said jaw defines a lever arm on the side of its pivot axis remote from said rounded-off edge, and said resilient means is constituted by springs biasing said lever arms so that the rounded-off edges of said jaws are urged toward one another.

3. A welding cylinder according to claim 1 wherein said means securing the ends of said band in said recess includes a radially adjustable block and means for making an electrical connection to each end of said band with the two ends of said band being electrically insulated from one another.

4. A welding cylinder according to claim 3 wherein said block is mounted on a tensioning screw radially inwardly extending through a supporting member and cooperating with an adjusting nut threadedly engaged with the radially inner-most end of said screw.

* * * * *